United States Patent [19]
Klein

[11] Patent Number: 4,847,978
[45] Date of Patent: Jul. 18, 1989

[54] TOOL HEAD CHANGER AND DRIVE MECHANISM

[75] Inventor: Richard J. Klein, Utica, Mich.

[73] Assignee: Litton Industrial Automation Systems, Inc., Florence, Ky.

[21] Appl. No.: 114,218

[22] Filed: Oct. 28, 1987

[51] Int. Cl.$^4$ ............................................. B23Q 3/157
[52] U.S. Cl. ......................................... 29/568; 29/40
[58] Field of Search .................... 29/568, 26 A, 40; 408/35

[56] References Cited

U.S. PATENT DOCUMENTS

| | | | |
|---|---|---|---|
| 3,286,595 | 11/1966 | Wollenhaupt | 409/235 |
| 3,762,036 | 10/1973 | Goebel | 29/568 |
| 3,834,218 | 9/1974 | Kralowetz | 29/368 |
| 4,125,932 | 11/1978 | Kielma et al. | 29/568 |
| 4,216,572 | 8/1980 | Matsushita et al. | 29/568 |
| 4,510,669 | 4/1985 | Ida et al. | 29/568 |
| 4,675,977 | 6/1987 | Kolblin et al. | 29/568 |

FOREIGN PATENT DOCUMENTS

| | | | |
|---|---|---|---|
| 144911 | 11/1980 | Japan | 29/568 |
| 1119820 | 10/1984 | U.S.S.R. | 29/568 |

Primary Examiner—William Briggs
Attorney, Agent, or Firm—Barnes, Kisselle, Raisch, Choate, Whittemore & Hulbert

[57] ABSTRACT

A machining center for machining a variety of different workpieces. Tool heads with a wide variety of tools are transferred from a storage area and oriented and presented one at a time by a turret to a machine tool in which they are received, accurately located, securely clamped and driven to machine a workpiece. A transfer device moves tool heads from a tool head circulating mechanism to the turret.

14 Claims, 7 Drawing Sheets

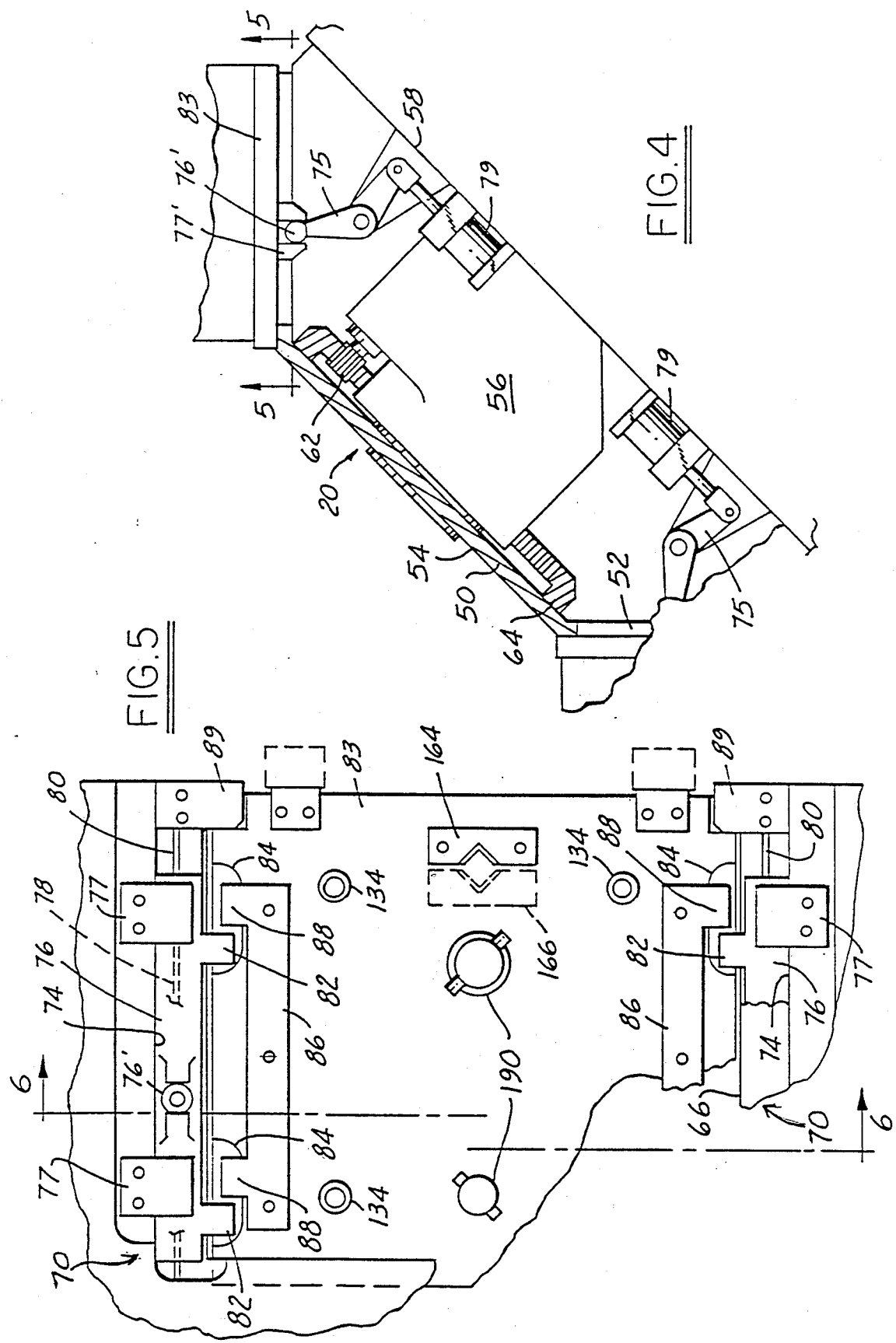

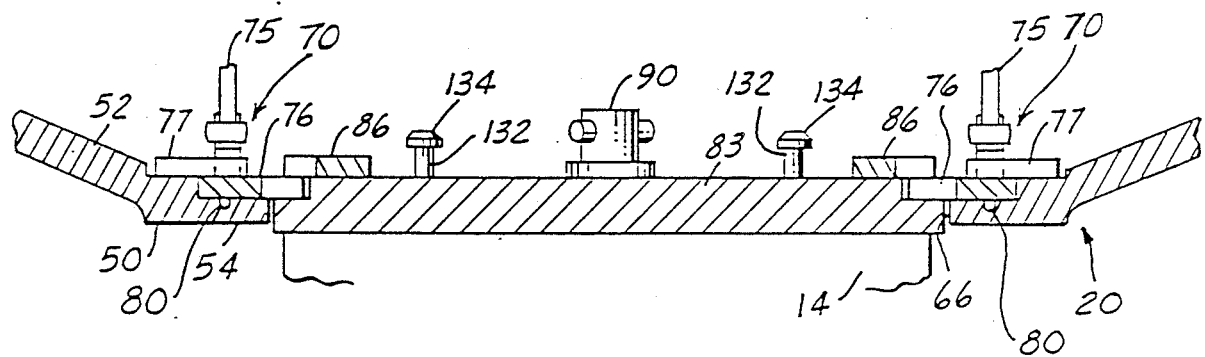
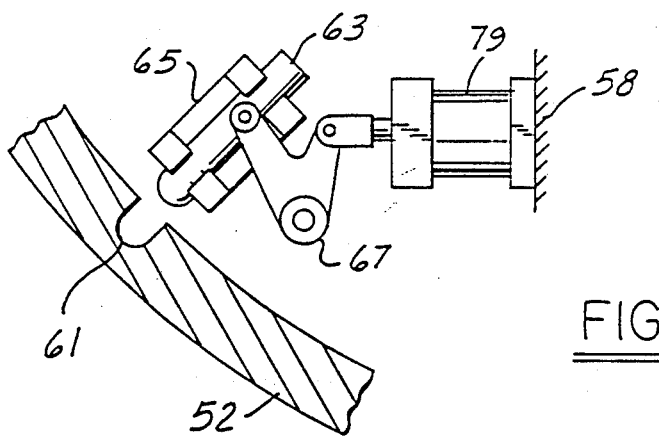
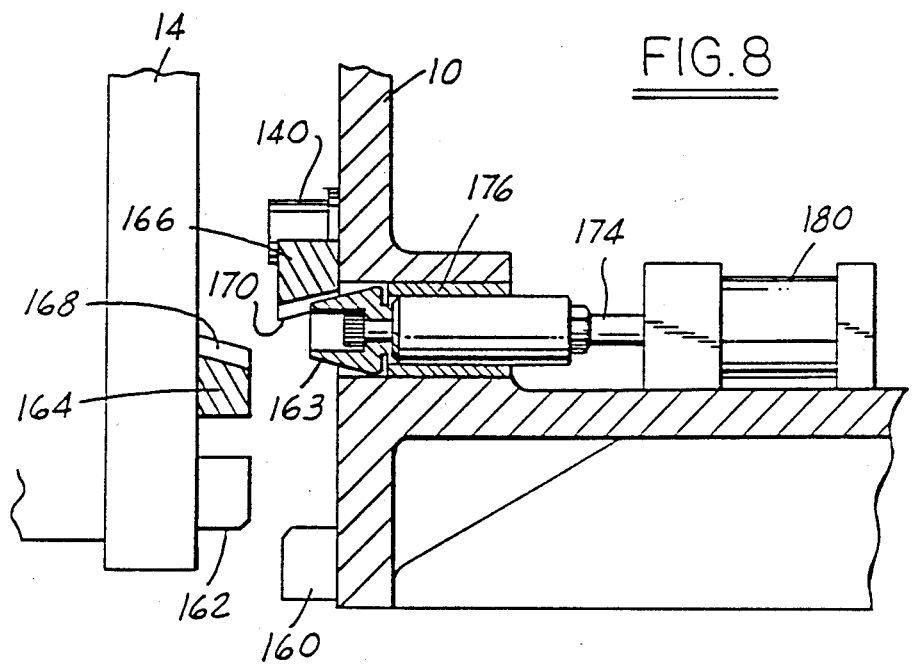

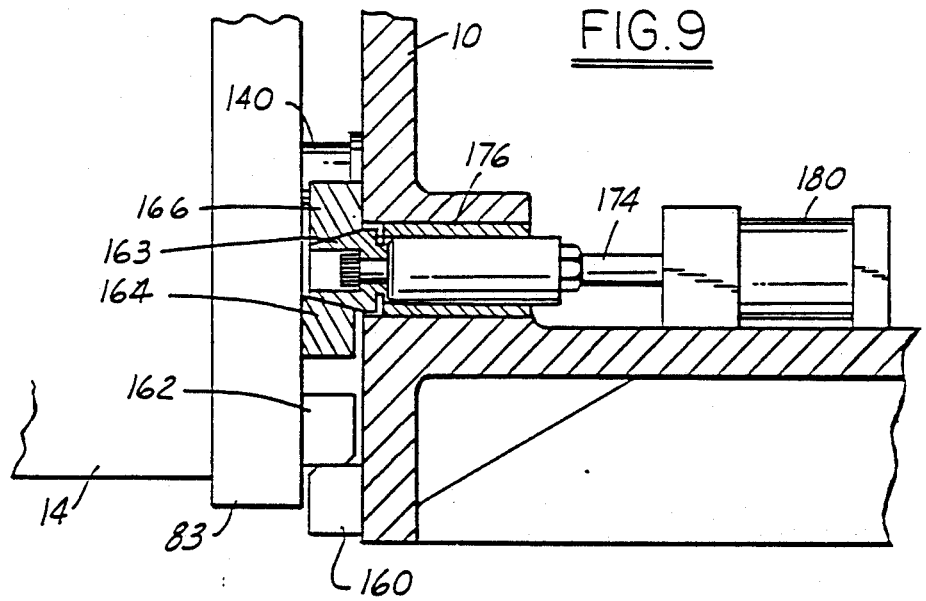
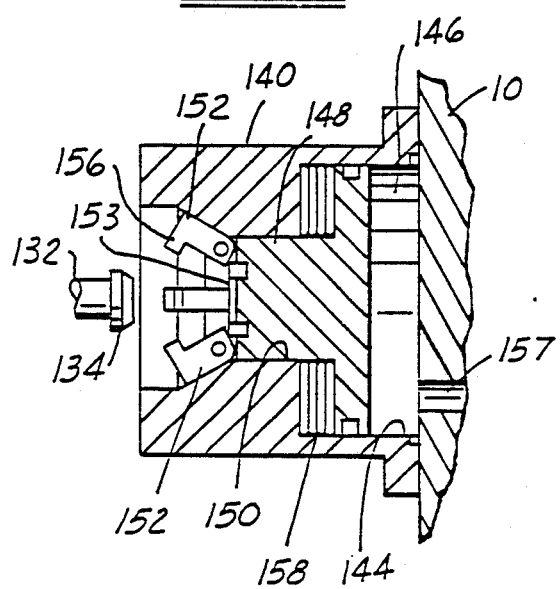
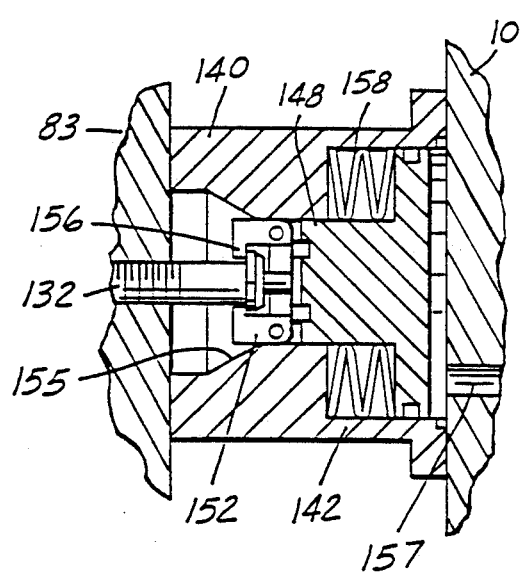

TOOL HEAD CHANGER AND DRIVE MECHANISM

This invention relates to a flexible manufacturing system, and more particularly to a flexible tool head changer and drive mechanism.

BACKGROUND

A flexible machining system with machine tools having automatic tool changers so the system can machine a variety of workpieces is previously known. One such flexible machining method and system with numerical control machine tools having tool changers is disclosed in U.S. Pat. Nos. 4,621,410; 4,369,563 and 4,237,598. These patents disclose a system in which tools are transferred in the sequence in which they will be used from a remote storage area to a transfer device adjacent a spindle of a machine tool. As needed, the transfer device moves the tool needed to the spindle of the machine tool for machining a work piece. A computer with a programmable memory controls the sequencing and movement of the tools from the remote storage area to the spindle in the sequence required for machining by the machine tool.

In these systems, substantial problems are encountered in making devices which reliably transfer and orient the tools and accurately locate and clamp them in a drive mechanism for machining a workpiece.

SUMMARY

In accordance with this invention, tool heads with a wide variety of tools therein are readily transferred from a storage area and oriented and presented one at a time by a turret to a machine tool in which they are received, accurately located, securely clamped and driven to machine a workpiece. Each tool is driven by the machine tool independently of the turret mechanism which sequentially transports and orients the tool heads for transfer between the machine tool and storage area.

Objects, features and advantages of this invention are to provide a tool head transfer and machine tool drive mechanism which can accommodate a wide variety of tools and tool heads, accurately locates and rigidly clamps the tool head to the machine tool for machining workpieces, orients the tool heads for transfer between the storage area and machine tool, and is highly reliable, accurate, rugged, durable and of relatively simple design, economical manufacture and assembly, and requires little service and maintenance in use.

BRIEF DESCRIPTION OF THE DRAWINGS

These and other objects, features and advantages of this invention will be apparent from the following detailed description, appended claims and accompanying drawings in which:

FIG. 4 is a fragmentary side view partly in section of a turret of the tool head changer.

FIG. 5 is an enlarged fragmentary view taken generally on the line 5—5 in FIG. 4.

FIG. 6 is a sectional view taken generally on the line 6—6 in FIG. 5.

FIG. 7 is a fragmentary sectional view showing a locking mechanism for the turret of the tool head changer.

FIG. 8 is a fragmentary sectional view of portions of the machine tool and a tool head before they are clamped together.

FIG. 9 is a fragmentary sectional view similar to FIG. 8 showing the tool head clamped to the machine tool.

FIG. 10 is a fragmentary sectional view of the mechanism for clamping the tool head to the machine tool.

FIG. 11 is a fragmentary sectional view similar to FIG. 10 showing the mechanism in the clamped position.

DETAILED DESCRIPTION

Figure 1:
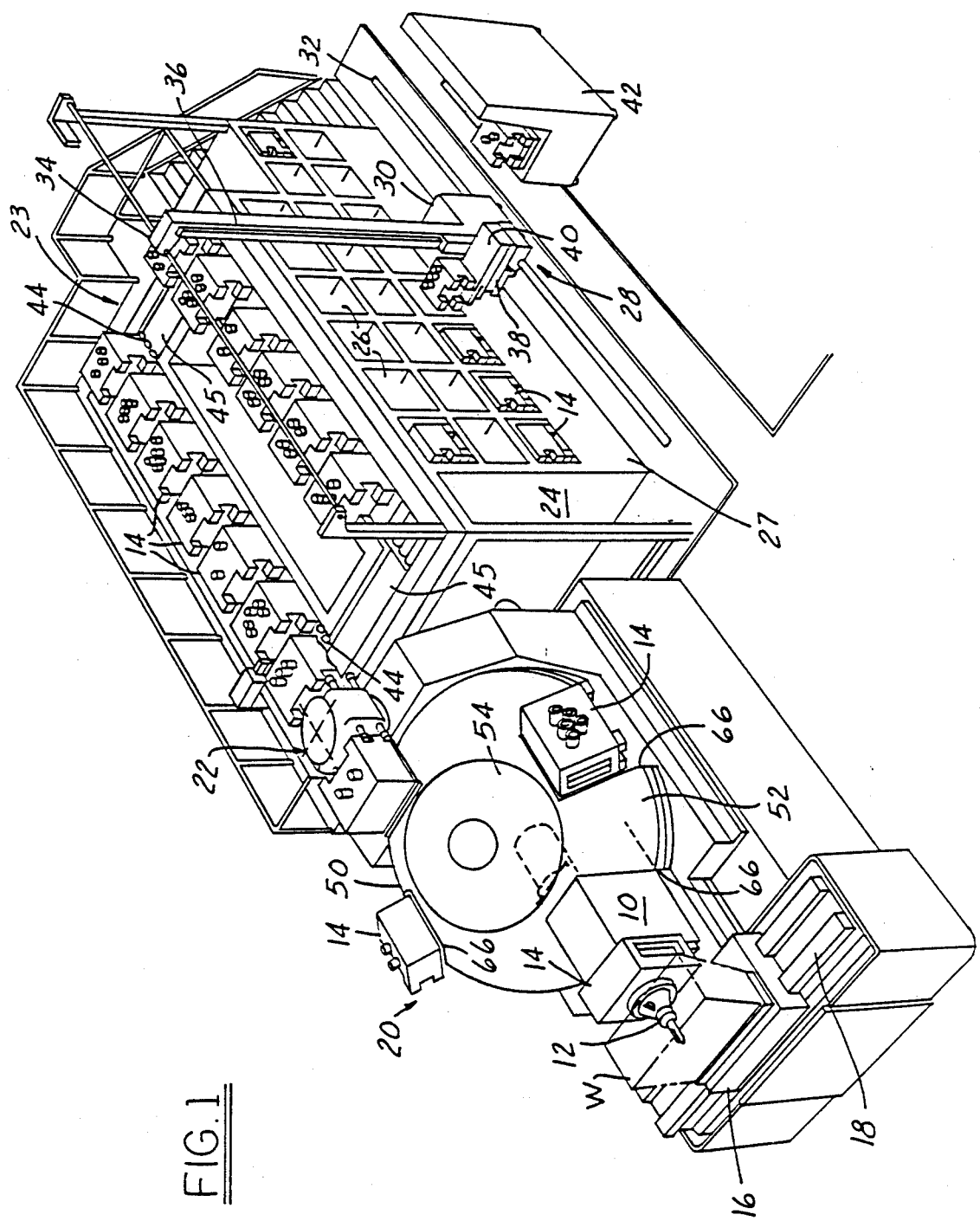
FIG. 1 is a perspective view of a flexible machining center embodying this invention.
Figure 3A:
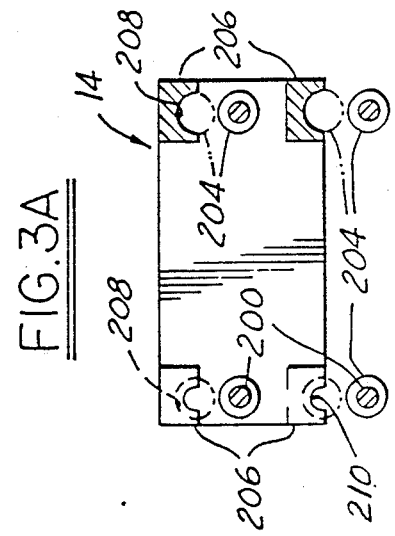
FIG. 3A is a view partly in section on the line 3A—3A in FIG. 3.

Referring now more particularly to the drawings and especially to FIG. 1, there is shown a flexible machining center having a machine tool 10 driving a tool 12 carried by a tool head 14 to remove metal from a workpiece W on a work table 16. The table 16 is mounted on rails 18 for movement to and from the operative position shown.

A tool head changer 20 is provided to deliver a selected tool head 14 to the machine tool. A transfer device 22 moves tool heads from a tool head circulating mechanism 23 to the tool head changer and back.

A storage rack 24 is provided to store large numbers of tool heads 14 having a wide variety of different tools thereon. The storage rack is in the form of an upright frame having a plurality of recesses 26 in a vertical wall 27 thereof, each recess providing space to store a single tool head.

A loader 28 is provided to transfer tool heads to and from the storage rack 24. The loader comprises a carriage 30 movable along a rail 32 in front of the wall 27 with recesses 26. The carriage 30 has a vertically upwardly extending mast 34 with a track 36 extending lengthwise thereof. A tool head support 38 is capable of traveling up and down the track 36. A table 40 is slidable on the support 38 for horizontal movement toward and away from the recesses 26 in the rack 24. Suitable drive means are provided for moving the carriage 30 in opposite directions along rail 32, for raising and lowering the support 38 and for moving the table 40 horizontally to and from the rack by controls at a station 42. In this manner, tool heads 14 may be deposited in selected recesses and removed therefrom, and also may be raised to the top of the mast and transferred to and from the circulation mechanism 23 atop the rack 24. The loader can also transfer tool heads 14 toward and from work station 42 where tools and/or heads may be repaired, replaced and changed.

The circulation mechanism 23 comprises a horizontal closed loop path or track upon which selected tool heads 14 are deposited and are adapted to circulate along the path. The track has two laterally spaced rows 43 of transverse rollers 44 extending cross-wise of the path and located close enough together to provide a supporting surface for the tool heads. Endless belts 45 extend between the two rows 43 of rollers at the ends of the rows. One belt extends across one end of one row of rollers, and the other belt extends across the other end of the other row of rollers. The rollers 44 in one row are rotated in one direction and rollers 44 in the other row are rotated in the opposite direction. The belts are orbited in opposite directions to produce a continuous orbiting of the tool heads around the track. The rollers 44 and belts 45 are power driven by suitable means not shown. The drive is stopped during operation of the transfer device 22.

Referring now to FIGS. 2-6, the tool head changer 20 comprises a turret 50 in the form of a frustum of a right circular cone. Thus the turret has a frusto-conical side wall 52 and an end wall 54 closing the small end of the side wall and disposed at right angles to the center line of the cone. The turret is mounted on a base 56 supported by the fixed frame 58 for rotation on an axis through the center of, and at right angles to, the turret end wall 54. The angle between diametrically opposite line segments of the side wall 52 drawn through the vertex of the cone is 90°. The turret 50 is set at an angle such that its axis of rotation is 45° to the horizontal, whereby the side wall at its low point is vertical and at its high point is horizontal (see FIGS. 2-4).

The turret is rotated about its axis by a motor 60 on the base 56 with a pinion 62 on its output shaft which engages a ring gear 64 on the inner side of the conical side wall 52.

The turret 50 may be accurately located and locked against rotation by shot pin mechanism shown in FIG. 7. The turret side wall 52 has a plurality of notches 61 spaced apart along its large end and adapted to be engaged by a pin 63 axially slidably mounted in a guide 65. The pin is moved axially by a pivoted bell crank 67 one arm of which is pivotally connected to the pin and the other arm of which is pivotally connected to the piston rod of a reversible piston-cylinder assembly 69 mounted on the frame 58.

The side wall 52 of the turret has four stations where individual tool heads are received equally circumferentially spaced 90° apart. Each station has a rectangular opening 66 (FIGS. 3-5) through the side wall 52. Each tool head is releasably retained on the turret by a pair of clamping mechanisms 70. As shown in FIG. 5 and 6, a pair of elongated clamping bars 76 are slidably received in recesses 74 in the opposite side edges of each opening. The clamping bars 76 are held in the recesses 74 by retainers 77 which permit the clamping bars to move longitudinally. The clamping bars 76 have ribs 78 extending lengthwise thereof and engaging grooves 80 at the bottoms of the recesses 74 to guide the lengthwise sliding movement of the clamping bars. Each clamping bar 76 is moved longitudinally by a pivoted bell crank 75 having a ball 76' on one arm received in spaced apart abutments 77' on the clamping bar. While the turret is indexing between stations these spaced apart abutments disengage from the balls. The other arm is pivotally connected to the end of the piston rod of a reversible piston-cylinder assembly 79 mounted on frame 58.

To engage a tool head, the clamping bars 76 each have a pair of longitudinally spaced projections 82 extending inwardly of opening 66 and receivable in recesses 84 along each side edge of the base 83 of each tool head. Elongated keeper bars 86 disposed inwardly of the recesses 84 have projections 88 which extend in overlying relation to the respective recesses 84. When a tool head is placed on the turret side wall 52 over one of the openings 66 and in horizontal and vertical positions shown in FIGS. 3 and 4, it can be coupled to the turret by energizing the cylinders 79 to shift the clamping bars 76 longitudinally so the projections 82 underlie the projections 88 to retain the tool head on the turret. The tool head can be released from the turret by energizing cylinders 79 to move the projections 82 so they are disengaged and spaced from the projections 88 as shown in FIG. 5. The tool head is also retained in the opening by its lose abutting on stops 89 fixed to the turret side wall.

A typical tool head 14 is shown in FIGS. 12-15. The tool head has a housing 90 for a spindle 92. The spindle 92 projects from the housing and has on its projecting end a reaming tool 94 which can be advanced and retracted relative to a chamfering tool 96. The spindle 92 is supported for rotation in a sleeve 98 by bearings 100. Sleeve 98 is capable of moving axially in an opening in housing wall 101. The spindle extends through a tubular member 102 which is journaled for rotation in bearings 104. The chamfering tool 96 is mounted on a hub 105 fixed to the tubular member 102 for rotation therewith. There is a splined driving connection 106 between the tubular member 102 and spindle 92 so that the spindle may be driven in rotation by the tubular member without interfering with its ability to move axially. A driven shaft 108 is mounted in the housing 90 for rotation by bearings 110. It has a gear 112 in mesh with an integral gear 114 on the tubular member 102 to rotate the tubular member and the spindle 92 when the shaft 108 is driven.

A second driven shaft 116 is mounted in the housing 90 for rotation by bearings 118 and has a worm 120 in mesh with a worm gear 122 on a cross shaft 124. The cross shaft 124 is journaled in the housing 90 by bearings 126 and has a gear 128 in mesh with a rack 130 on sleeve 98 to impart axial movement to the sleeve and hence to the spindle 92 for advancing and retracting the reaming tool 94.

Studs 132 with heads 134 project from the base 83 of the tool head 14 for clamping the head to the machine tool as described more fully hereinafter.

Figure 2:
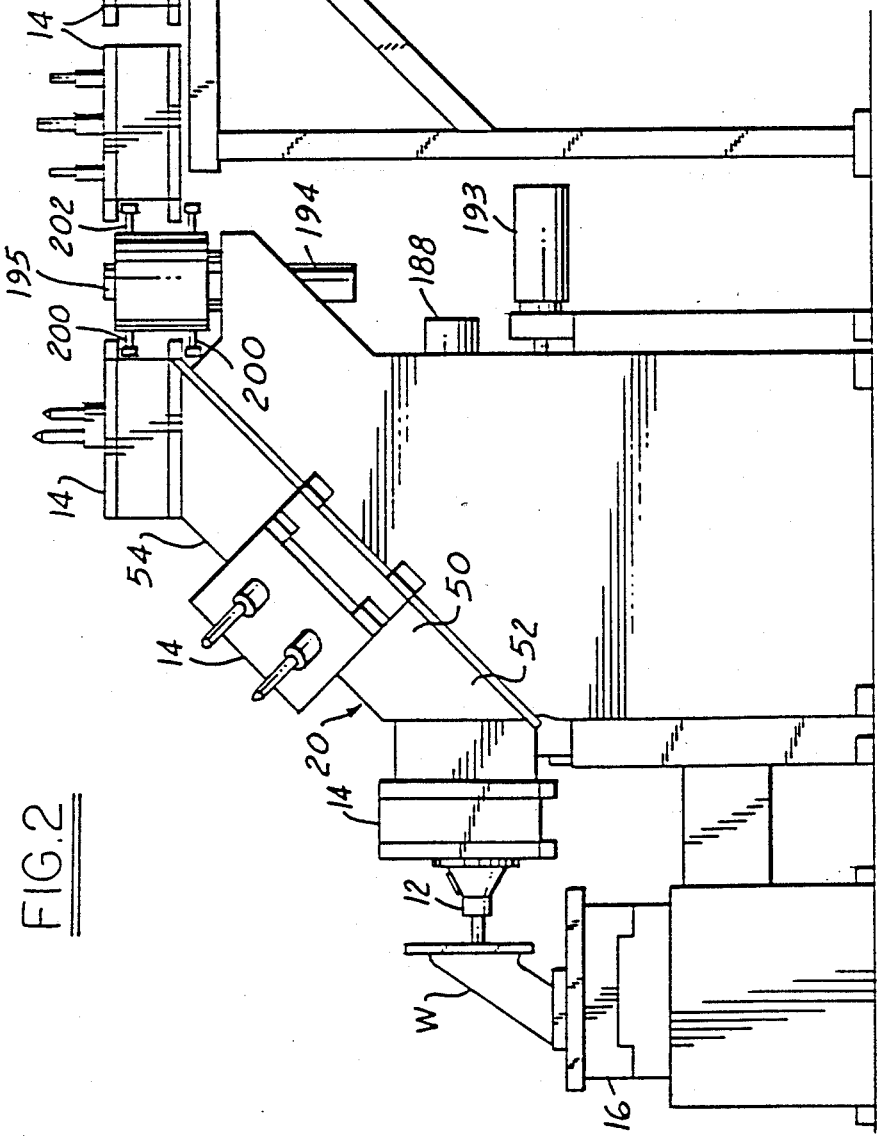
FIG. 2 is a fragmentary side view illustrating the tool head changer, machine tool and workpiece machining station of the center.
Figure 3:
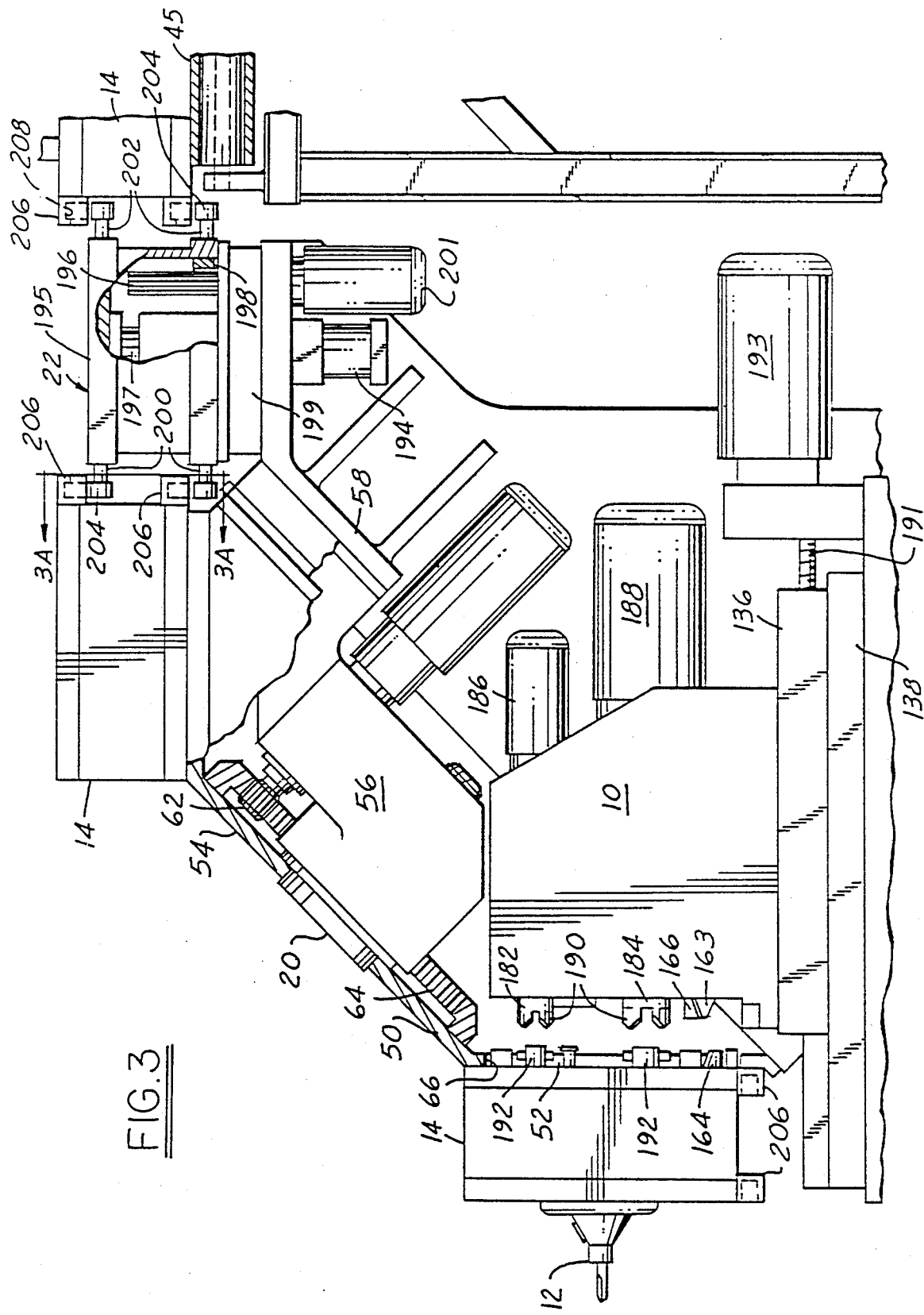
FIG. 3 is an enlarged fragmentary side view with portions broken away of the tool head changer and machine tool of FIG. 2.
Figure 12:
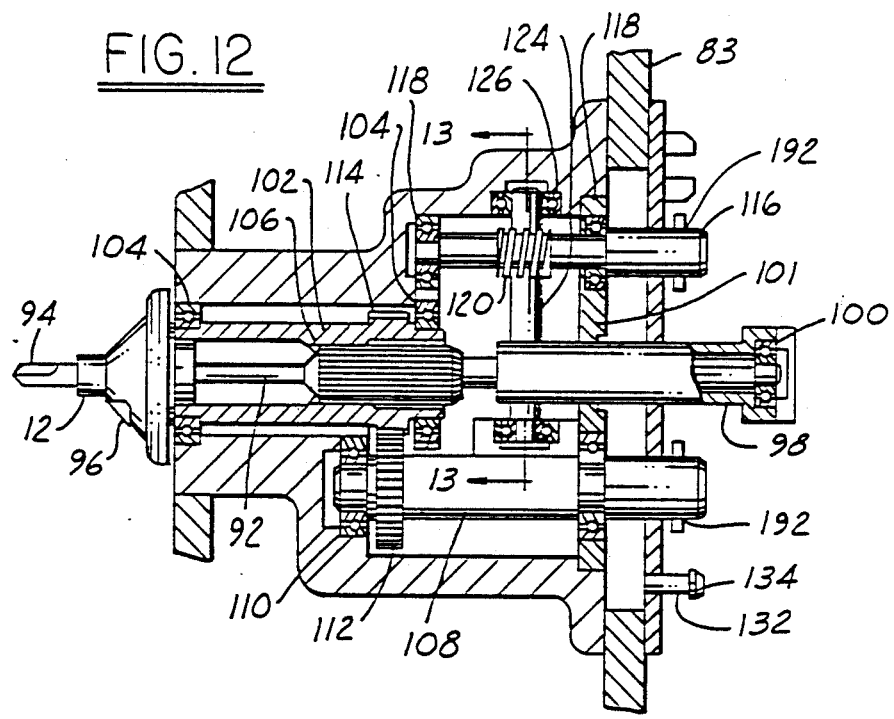
FIG. 12 is a sectional view of a tool head.

As shown in FIG. 3, the machine tool 10 is supported on a carriage 136 beneath the turret for horizontal reciprocation on a track 138 toward and away from the portion of the turret side wall 52 which is vertical. Preferably, the path of movement of the machine tool is in a vertical plane which includes the axis of rotation of the turret. The openings 66 in the turret side wall 52 are of size sufficient to provide clearance for the machine tool so it can move from the retracted position illustrated in FIG. 3 to an extended position projecting through the opening as illustrated in FIGS. 1 and 2.

When the turret 50 is rotated to a position in which one of the openings 66 is vertical and aligned with the path of movement of the machine tool 10, and with a tool head 14 secured to the turret over the aligned opening, the machine tool may be advanced into substantial engagement with the base plate 83 of the tool head and the tool head clamped to the machine tool by clamps 140 (FIG. 10) in the machine tool. One clamp 140 is be provided for each of the four studs 132 on the base of the tool heads. The clamps are of a well-known construction shown in U.S. Pat. No. 4,577,847 incorporated herein by reference and hence will be only briefly described. The clamp 140 is mounted in the housing of the machine tool 10 and has a body 142 with a cylinder 144 therewithin in which a piston 146 reciprocates. The piston 146 has a central extension 148 slidable within a bore 150 of reduced diameter relative to cylinder 144. On the end of the extension 148 are a circular array of pivoted clamping dogs 152. These dogs are biased by a spring 153 to swing outwardly to the released position shown in FIG. 10. To accommodate this outward movement of the dogs to released position the bore 144 has a flared end portion 155. The clamp dogs are L-shaped to provide transverse ends 156 adapted to engage over the head 134 of a stud 132 when the machine tool engages the base 83 of a tool head to clamp the tool head to the machine tool.

The piston 146 is moved to the released position of FIG. 10 by fluid pressure entering the cylinder through a port 157, against the bias of belleville washer compression springs 158 on the opposite side of the piston. The piston is moved to the clamped position shown in FIG. 11 by the pressure of the springs 158 when the opposite end of the cylinder 144 is relieved of fluid pressure.

When the machine tool 10 is moved toward a tool head on turret 50 and into substantial engagement therewith, initially these are generally aligned by wedges 160 (FIG. 9) on the machine tool engaging complimentary wedges 162 on the tool head. They are also more precisely aligned by the cooperation of a wedge 163 with cam members 164 and 166 (FIG. 8). Cam members 164 and 166 have bearing surfaces 168 and 170 each tapered with a generally V-shape cross section as shown in FIGS. 5 and 8. The cam members 164 and 166 are fixed to the head and machine tool respectively. The wedge 163 is cone-shaped and tapered at an angle complimenting the cam surfaces 168 and 170. To achieve a final alignment of the tool head with respect to the machine tool, the wedge 163 is advanced from the FIG. 8 to the FIG. 9 position into firm wedging engagement with the surfaces 168 and 170 of the cam members.

This alignment is not restricted by the turret rotating mechanism because it allows the tool head to shift within predetermined limits with respect to the turret.

The wedge 163 is mounted on a rod 174 guided for reciprocation in a sleeve 176 carried by the machine tool. The rod is reciprocated by a piston-cylinder assembly 180.

As shown in FIG. 3, the machine tool 10 has drive spindles 182 and 184 respectively driven by motors 186 and 188. These drive spindles have couplings 190 adapted to drivingly engage with couplings 192 on driven shafts 108 and 116 of a tool head 14 when the tool head is clamped to the machine tool. The machine tool is advanced and retracted by a lead screw 191 driven by a controlled reversible motor 193.

The transfer device 22 transfers tool heads from the circulating mechanism 23 to the turret 50 and back, at the point where a station on the turret side wall 52 is horizontal. The transfer device has a carrier head 195 mounted for rotation and reciprocation by a shaft 197 received in a bearing housing 199. The carrier head is raised and lowered by a fluid actuated piston-cylinder assembly 194 mounted on the frame 58. The carrier head is rotated by a motor 201 mounted on the frame 58 with an elongated pinion 196 on its output shaft which remains in mesh with a ring gear 198 on the inner wall of the turret head in its raised as well as its lowered position.

The carrier head 195 has laterally spaced pairs of upper and lower horizontal arms 200 on one side and laterally spaced pairs of upper and lower horizontal arms 202 on the diametrically opposite side. Each arm has an enlarged cylindrical head 204 on its end. The tool heads 14 have laterally spaced pairs of upper and lower sockets 206 projecting from one side thereof, each having a partially cylindrical recess 208 dimensioned to closely receive the heads 204. The socket walls are slotted at 210 to clear the arms 200 and 202.

To transfer a tool head between the circulating mechanism 23 and turret 50, and with tool heads in the position shown in FIG. 3, the carrier 195 is raised to cause the heads 204 to enter socket recesses 208 on both tool heads. The tool heads are then lifted clear, rotated 180° and then lowered, so that the tool head that was on the circulating mechanism is now on the turret, and vice versa.

In operation, the storage rack 24 is loaded by means of loader 28 with a large number of tool heads 14 having a wide variety of different tools. The loader 28 is also used to transfer selected tool heads to the circulating mechanism 23 located on top of the storage rack 24. Transfer of the tool head is effected by circulating the tool heads until the selected tool head is adjacent the transfer device 22 and then stopping the circulating mechanism. The carrier head of the transfer device 22 is then elevated to pick up the selected tool head 14 and then rotated 180° and lowered to deposit the selected tool head in a station 66 in the horizontal portion of the turret side wall. The turret has, of course, initially been rotated to bring a station 66 into alignment with the transfer device.

After the selected tool head is deposited in the station 66 on the horizontal position of the turret, the deposited tool head is secured to the turret by operation of the piston-cylinder assemblies 79 to shift clamping bars 76 from the position illustrated in FIG. 5 to a position in which the projections 82 thereof underlie the projections 88. In the same manner, additional tool heads may be selected and secured on the turret in the remaining stations 66, in the sequence needed for machining operations.

The turret 50 is rotated to present the desired particular tool head retained thereon to the vertical position shown in FIG. 3, and then stopped and locked by actuating the shot pin 63. The machine tool 10 is then advanced into substantial engagement with the base of the tool head and stopped. The tool head is generally aligned by engagement of the cam locators 160 and 162 and accurately aligned by advancing the wedge 163 into engagement with the cam blocks 164 and 166. The tool head is then securely clamped to the machine tool by actuating clamps 140. Thereafter, the tool head is released from the turret by actuating the cylinders 79 to shift the clamping bars 76.

Figure 14:
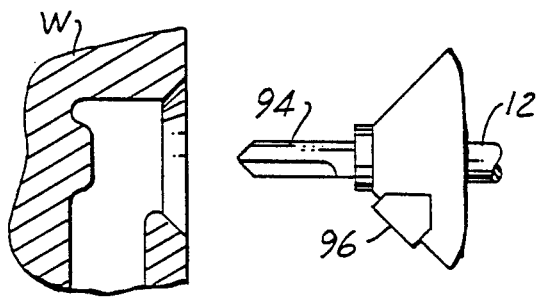
FIG. 14 is a fragmentary view illustrating a tool on a tool head prior to engagement with a workpiece.
Figure 13:
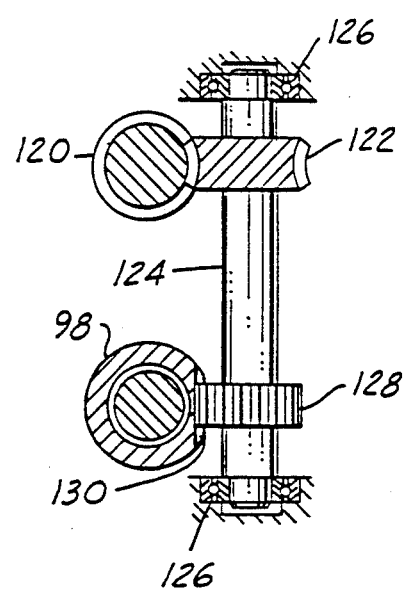
FIG. 13 is a sectional view taken on the line 13—13 in FIG. 12.
Figure 15:
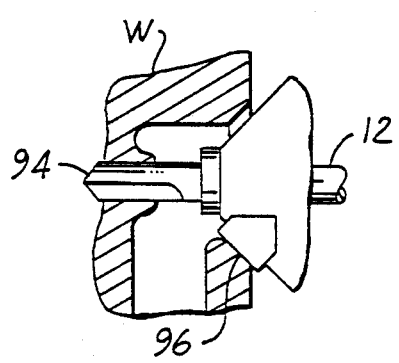
FIG. 15 is a fragmentary view similar to FIG. 14 showing the tool engaging the workpiece.

A machining of the workpiece W may then be carried out by advancing the machine tool through the aligned opening 66, carrying with it the tool head 14 mounted thereon into a position in which the workpiece is machined as shown in FIGS. 14 and 15. When this machining operation is completed, the machine tool and tool head are retracted. If the same tool is needed for the next machining operation on either the same or another workpiece, the machine tool and tool head are again cycled to perform this machining operation.

However, when a different tool is required to perform a machining operation, the machine tool is retracted sufficiently and then stopped so that the tool head is positioned in the station 66 in the vertical position. The tool head is then secured to the turret by actuating the associated cylinder 79 to shift the clamping bars 76 to their latched position. The tool head is then unclamped from the machine tool by releasing the clamps 140. Thereafter, the machine tool is fully retracted so that it will not interfere with the turret which is then indexed to remove this tool head and to move to the vertical position the different tool head needed for the next machining operation.

The machine tool may be advanced to engage this different tool head which is then clamped thereto and released from the turret and then utilized to perform a machining operation all in the manner already described.

Preferably, although not necessarily, the sequencing cycling and operation of the loader 28, circulating mechanism 23, transfer device 22, turret assembly 20, machine tool 10 and transfer of workpieces, are all controlled to machine a wide variety of workpieces by a central processing unit, such as a programmable controller, or a digital computer with a suitable computer program. Since the design construction, operation and programming of such central processing units are well-known they will not be described herein.

I claim:

1. A machining center for performing a variety of different machining operations on workpieces comprising,
   a machine tool,
   a plurality of tool heads having a variety of different tools thereon,
   releasably clamps carried by said machine tool for mounting said tool heads on said machine tool one at a time,
   alignment means carried by said machine tool for accurately aligning a tool head on said machine tool,
   a drive carried by said machine tool for driving the tool of a tool head mounted thereon,
   a supply of a plurality of tool heads,
   a tool changer for transferring selected tool heads from said supply of a plurality of tool heads to said machine tool and back,
   said tool changer comprising a turret having a tool head station provided with a releasable retainer means for retaining a tool head thereon,
   means mounting said turret for rotation such that said tool head station moves from a first position adjacent said supply of tool heads in which said station is oriented in a first plane suitable for loading and unloading a tool head to a second position adjacent said machine tool in which said station is aligned with said machine tool and oriented in a second plane suitable for transfer of a tool head to and from said machine tool, said first plane and said second plane being at generally a right angles to each other and one of said planes extending generally horizontally and the other of said planes extending generally vertically,
   said releasable retainer means loosely retaining a tool head on said station when in said second position so that said tool head can shift relative to said turret within predetermined limits to be accurately aligned on and positively clamped to said machine tool while still retained on said station and before being released therefrom by said retainer means, and
   means mounting said machine tool for movement relative to said turret along a path through said tool head station when in said second position so that if desired a tool head can be transferred from one to the other of said machine tool and turret and when said machine tool is advanced along such path from said turret with a tool head thereon secured by said releasable clamps and driven by said drive a tool thereof will machine a workpiece, and when said machine tool is retracted along such path from said turret and clears said station when in said second position said turret can be rotated to transfer a tool head retained in said tool head station between said machine tool and said supply of tool heads.

2. A machining center as set forth in claim 1, wherein said first plane is horizontal and said second plane is vertical.

3. A machining center as set forth in claim 1, wherein said machine tool is movable from a retracted position withdrawn from said turret to an advanced position projecting across the path of rotary movement of said station and said turret is constructed and shaped to clear said machine tool when said station is aligned with said machine tool and said machine tool is moved to said advanced position.

4. A machining center as set forth in claim 1, wherein said turret has one or more additional stations each provided with releasable retainers for mounting a tool head thereon.

5. The machining center of claim 1 which also comprises, said tool head supply being constructed and arranged to receive and carry a plurality of tool heads at least some of which have different tools thereon, a transfer station for receiving any one of the tool heads for transfer to said turret and for receiving tool heads transferred from said turret, and a drive mechanism for moving tool heads into and from said transfer station.

6. A machine center for performing a variety of different machining operations on a workpiece,
   comprising a machine tool,
   a plurality of tool heads having a variety of different tools thereon,
   releasable clamps carried by said machine tool for mounting said tool heads on said machine tool one at a time,
   a drive carried by said machine tool for driving the tool of a tool head mounted thereon,
   a tool changer for transferring selected tool heads from a supply of a plurality of tool heads to said machine tool and back,
   said tool changer comprising a turret having a conical side wall,
   a tool head station on said side wall provided with releasable retainer means for mounting a tool head thereon,
   means mounting said turret for rotation on an inclined axis such that said tool head moves from a first position adjacent said supply of tool heads in which said station is oriented in a first plane suitable for loading and unloading a tool head to a second position adjacent said machine tool in which said station is aligned with said machine tool and oriented in a second plane suitable for transfer of a tool head to and from said machine tool,
   said releasable retainer means loosely retaining a tool head on said station when in said second position so that said tool head can shift relative to said turret within predetermined limits to be accurately aligned on and positively clamped to said machine tool while still retained on said station and before being released therefrom by said retainer means, and means mounting said machine tool for movement relative to said turret along a path through said tool head station when in said second position so that if desired a tool head can be transferred from one to the other of said machine tool and turret and when said machine tool is advanced along such path from said turret with a tool head thereon secured by said releasable clamps and driven by said drive a tool thereof will machine a workpiece, and when said machine tool is retracted along such path from said turret and clears said station when in said second position said turret can be rotated to transfer a tool head retained in said tool head station between said machine tool and said supply of tool heads.

7. A machining center as set forth in claim 6, wherein said turret is of right circular conical form and is mounted for rotation about it central axis.

8. A machining center as set forth in claim 7, where the angle between diametrically opposite line segments of said side wall is 90°, said axis is set at a 45° angle to the horizontal, said first plane is horizontal and said second plane is vertical.

9. A machining center as set forth in claim 6, wherein a plurality of additional stations are provided on said side wall in circumferentially spaced relation to said first-mentioned side wall and to each other and each provided with releasable retainers for retaining a tool head thereon.

10. A machining center as set forth in claim 9, wherein said turret side wall has an opening at each station of a size to accommodate said machine tool, and said machine tool is movable from a retracted position withdrawn from said turret to an advanced position projecting through the opening at an aligned station on said turret side wall.

11. A machining center as set forth in claim 10, wherein said releasable clamps for mounting a tool head on said machine tool includes means for aligning and positively clamping a tool head in accurately located position while said releasable retainer means retains such tool head loosely so that said tool head may shift relative to said turret to be aligned and positively clamped to said machine tool while still retained on said station and before being released by said retainer means.

12. The machining center of claim 5 which also comprises a transfer device operably associated with said tool head supply and said turret for transferring tool heads between said transfer station and said turret.

13. The machining center of claim 5 wherein said drive comprises mechanism at least one conveyor.

14. The machining center of claim 5 wherein said drive mechanism comprises a recirculating conveyor.

* * * * *